United States Patent [19]

Takano et al.

[11] Patent Number: 5,437,437

[45] Date of Patent: Aug. 1, 1995

[54] VIBRATION ISOLATOR WITH DIAPHRAGMS IN EACH SIDE WALL

[75] Inventors: Kazuya Takano, Kamakura; Hiroshi Kojima, Yokohama; Takao Ushijima, Chigasaki, all of Japan

[73] Assignee: Bridgestone Corporation, Tokyo, Japan

[21] Appl. No.: 353,285

[22] Filed: Dec. 5, 1994

Related U.S. Application Data

[62] Division of Ser. No. 915,132, Jul. 20, 1992, Pat. No. 5,393,041.

[30] Foreign Application Priority Data

| Jul. 23, 1991 | [JP] | Japan | 3-182434 |
| Sep. 3, 1991 | [JP] | Japan | 3-223038 |
| Sep. 9, 1991 | [JP] | Japan | 3-227799 |
| Sep. 30, 1991 | [JP] | Japan | 3-251758 |
| Nov. 6, 1991 | [JP] | Japan | 3-290130 |
| Nov. 6, 1991 | [JP] | Japan | 3-290131 |

[51] Int. Cl.[6] .......................... F16F 11/00; F16F 9/00
[52] U.S. Cl. ............................... 267/140.14; 267/140.2
[58] Field of Search ............... 267/35, 140.11, 140.13, 267/140.14, 140.15, 140.2, 140.5, 141.6, 141.7, 136, 219; 123/192.1; 180/300, 312, 902; 248/631, 638, 636, 562, 550

[56] References Cited

U.S. PATENT DOCUMENTS

| 5,170,998 | 12/1992 | Muramatsu | 267/140.13 |
| 5,215,292 | 6/1993 | Ishiyama et al. | 267/140.12 |

FOREIGN PATENT DOCUMENTS

| 58-54247 | 3/1983 | Japan | 267/140.13 |
| 0012153 | 1/1989 | Japan | 267/140.13 |
| 2-42226 | 2/1990 | Japan . | |
| 2-42227 | 2/1990 | Japan . | |

Primary Examiner—Josie A. Ballato
Attorney, Agent, or Firm—Oliff & Berridge

[57] ABSTRACT

A main liquid chamber communicates with a first auxiliary liquid chamber and a second auxiliary liquid chamber via a first limiting passage and a second limiting passage, respectively. The first and second auxiliary liquid chambers are located adjacent first and second air chambers via first and second diaphragms, respectively. As a solenoid valve is changed over, the second air chamber is made to communicate with the negative pressure of an engine or the with atmospheric pressure. The second liquid chamber is disposed in a hollow cylindrical member. When frequencies of vibrations are below a predetermined frequency, the negative pressure of the engine is transmitted to the second air chamber, causing the second diaphragm to be brought into close contact with and fixed to an inner wall of the second air chamber. As a result, a liquid passing through the first limiting passage absorbs the vibrations. When the frequencies of the vibrations become high, the first limiting passage becomes incapable of absorbing the vibrations, and the atmospheric pressure is imparted to the second air chamber. For this reason, the second diaphragm becomes deformable, so that the liquid passes through the second limiting passage to absorb the vibrations. In addition, a third auxiliary liquid chamber and accompanying third limiting passage can be provided to absorb high-frequency vibrations. The length of this third limiting passage is made shorter than that of the second limiting passage and the resonance of the liquid in the third limiting passage is made higher than that in the second limiting passage.

12 Claims, 12 Drawing Sheets

FIG. 3
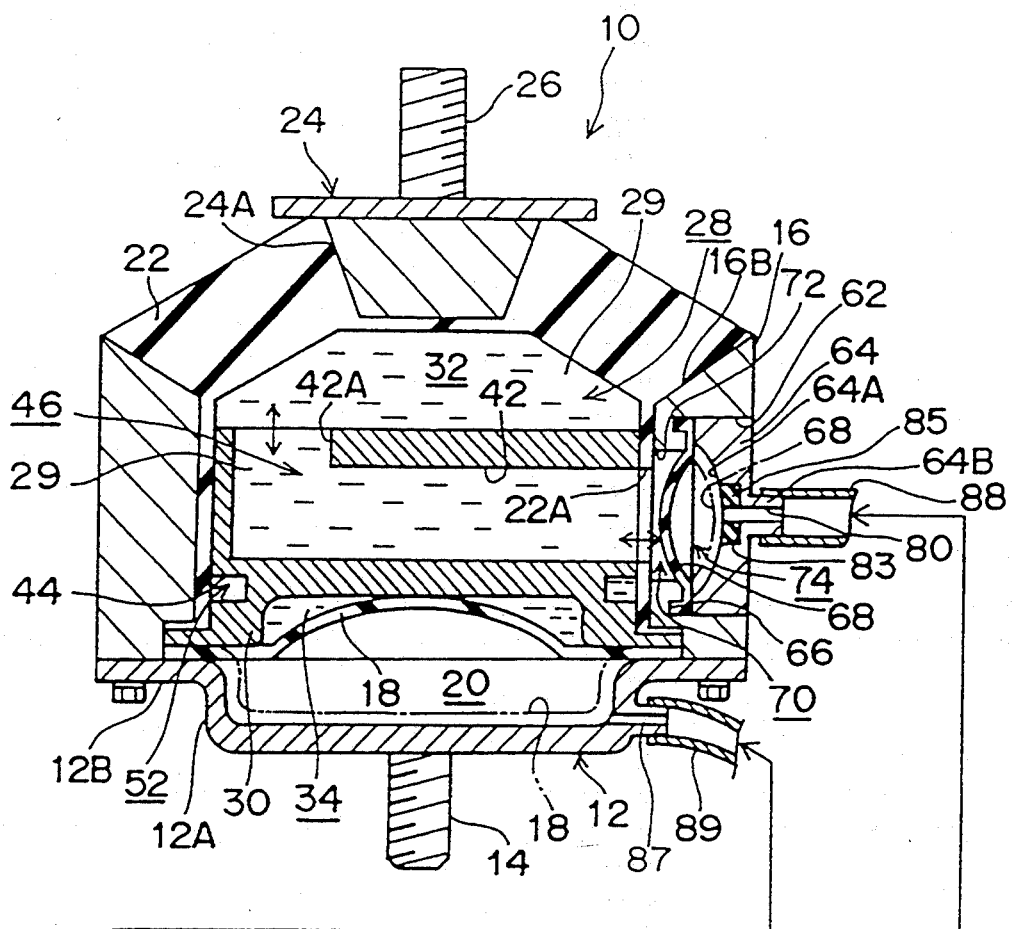
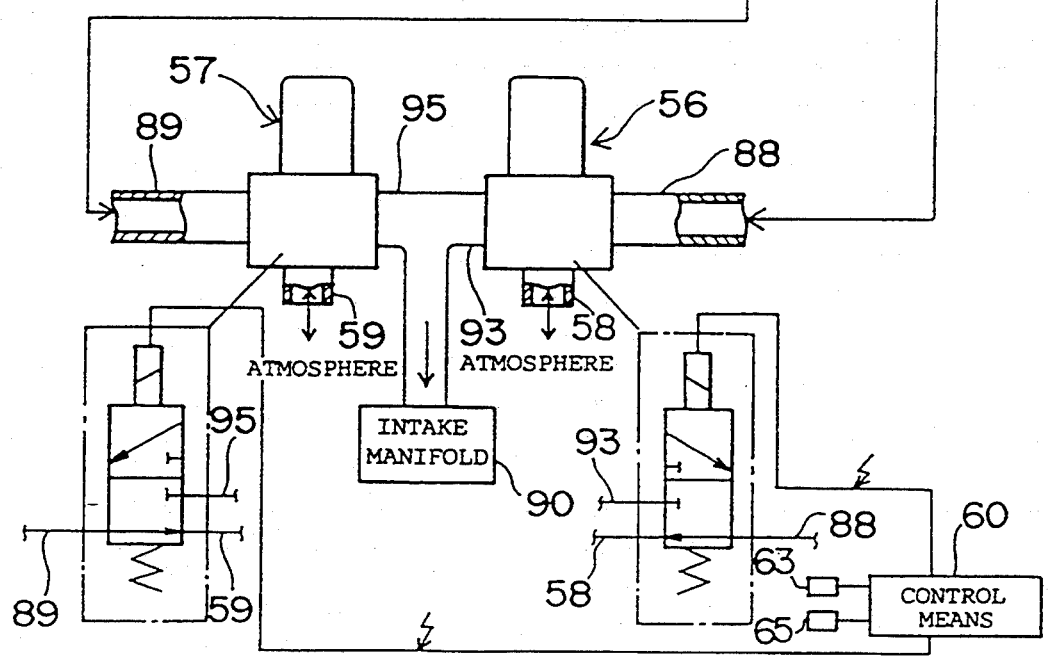

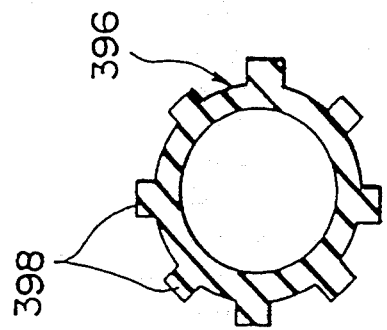
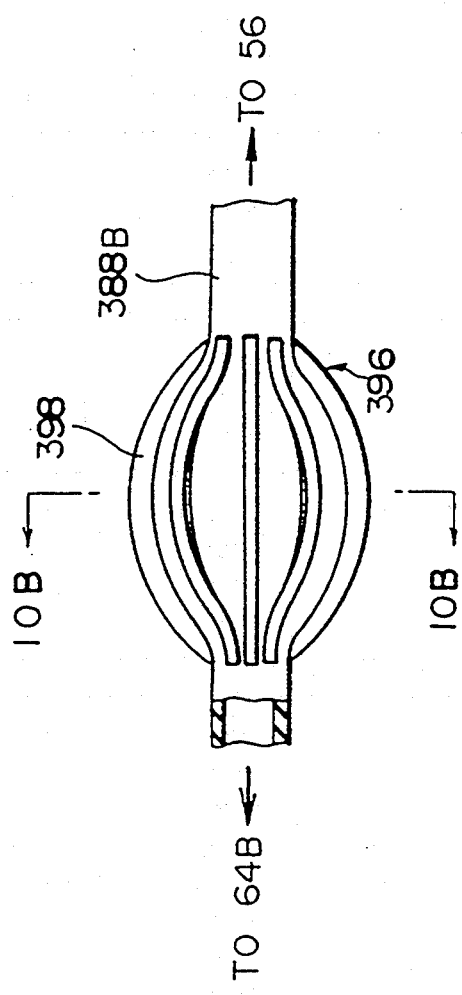

VIBRATION ISOLATOR WITH DIAPHRAGMS IN EACH SIDE WALL

This is a Division of application Ser. No. 07/915,132 filed Jul. 20, 1992, now U.S. Pat. No. 5,393,041.

BACKGROUND OF THE INVENTION

1. Field of the Invention

The present invention relates to a vibration isolator for use in a general industrial machine or the like and adapted to absorb and attenuate vibrations from a vibration-generating portion.

2. Description of the Related Art:

In an automobile engine, a vibration isolator serving as an engine mount is interposed between the engine and the chassis, so as to prevent the vibrations of the engine from being imparted to the chassis.

Vibrations occurring in the engine include so-called shaking vibrations which occur when the vehicle travels at high speed, as well as idling vibrations which occur during idling and when the vehicle travels at about five kilometers per hour.

In general, the shaking vibrations have a frequency of less than 15 Hz, while the idling vibrations have a frequency of 20 to 40 Hz, so that the frequency differs between the shaking vibrations and the idling vibrations.

A vibration isolator of a liquid-sealed type has been proposed as a vibration isolator for absorbing the shaking vibrations and the idling vibrations. This vibration isolator is provided with a main liquid chamber and an auxiliary liquid chamber, and the main liquid chamber and the auxiliary liquid chamber are connected to each other via a plurality of limiting passages of different sizes. Each of the limiting passages is opened or closed by a changeover valve which is driven by a driver such as a motor. Desired limiting passages connect the main liquid chamber and the auxiliary chamber, and a liquid passes through the connecting limiting passages and is thereby subjected to passage resistance or liquid-column resonance, thereby absorbing the vibrations of desired frequencies.

With this vibration isolator, however, the changeover valve is provided in the interior of the vibration isolator, while the driver such as the motor is disposed on the outside of the vibration isolator. Accordingly, the interior of the vibration isolator becomes complicated owing to component parts including the changeover valve. In addition, a hole for allowing the interior and the exterior of the vibration isolator to communicate with each other is provided to connect the driver such as the motor to the changeover valve. Through this hole, the changeover valve is connected to a driving shaft of the motor or the like. A seal is provided in a gap between the hole and the driving shaft to ensure that the liquid will not leak through the gap. Since the driving shaft and the seal undergo sliding relative to each other, the durability becomes an important problem. Hence, if emphasis is placed on the durability, the structure of the seal portion becomes complicated.

SUMMARY OF THE INVENTION

In view of the above-described circumstances, it is an object of the present invention to provide a vibration isolator capable of absorbing vibrations over a wide frequency range without requiring a complicated structure.

To this end, in the present invention, a main liquid chamber, a first auxiliary liquid chamber, and a second auxiliary liquid chamber are provided in a hollow cylindrical member. The main liquid chamber is made to communicate with the first auxiliary liquid chamber and the second auxiliary liquid chamber via first and second limiting passages, respectively. First and second air chambers are respectively provided in these auxiliary liquid chambers via first and second diaphragms. A negative-pressure means is made to communicate with the second air chamber.

Vibrations of, for instance, an engine or the like are absorbed by resistance based on the internal friction of a resilient member, and are also absorbed by the passing resistance or liquid-column resonance of a liquid flowing through the first or second limiting passage.

When frequencies of vibrations are below a predetermined frequency, the interior of the second air chamber is set under negative pressure by the negative-pressure means, so as to cause the second diaphragm constituting a partition wall of the second auxiliary liquid chamber to be brought into close contact with and fixed to the inner wall of the second air chamber. As a result, the second air chamber virtually disappears, and the second auxiliary liquid chamber becomes incapable of undergoing expansion and shrinkage, so that the liquid does not flow through the second limiting passage. Accordingly, the liquid flows only through the first limiting passage, so that the vibrations of frequencies below the predetermined frequency are effectively absorbed by the resistance and liquid-column resonance occurring when the liquid passes through the first limiting passage.

On the other hand, when the frequencies of the vibrations are above the predetermined frequency, the interior of the second air chamber is not set under negative pressure or in a pressurized state by the negative-pressure means. For this reason, the second diaphragm moves away from the inner wall of the second air chamber and becomes resiliently deformable, so that the second auxiliary liquid chamber becomes expandable and shrinkable. Consequently, the liquid is capable of flowing through the second limiting passage, and the vibrations over a predetermined frequency range can be absorbed by the liquid-column resonance occurring when the liquid passes through the second limiting passage.

As the second diaphragm is brought into close contact with and fixed to the inner wall of the second air chamber by using the intake negative pressure of an intake manifold of the engine as the negative-pressure means, the second limiting passage is virtually closed. Accordingly, the interior of the vibration isolator does not become complicated as compared with a conventional vibration isolator in which the limiting passages are changed over by using a changeover valve. In addition, since rotating or sliding portions are not employed, a seal for the liquid can be arranged simply. Hence, the overall arrangement of the vibration isolator is simplified.

The second diaphragm in a free state is able to have a cross-sectionally convex shape projecting toward the second auxiliary liquid chamber, and the inner wall surface of the second air chamber facing the second diaphragm can be substantially symmetrical with a configuration of the second diaphragm with a plane between the second auxiliary liquid chamber and the second air chamber serving as a plane of symmetry. As such, when the interior of the second air chamber is set under negative pressure, the second diaphragm changes its shape and becomes convex toward the second air chamber. Moreover, since the configuration of the inner wall surface of the second air chamber is shaped substantially in conformity with the shape of the second diaphragm, the second diaphragm can be brought reliably into close contact with the inner wall surface of the second air chamber.

Since the first air chamber can be connected to the negative-pressure means, the interior of the first air chamber can be set under negative pressure to cause the first diaphragm to be brought into close contact with the inner wall surface of the first air chamber, thereby making it impossible for the first auxiliary liquid chamber to expand or shrink. Accordingly, when the engine is stopped or started, if the interiors of the first and second air chambers are set under negative pressure by the negative-pressure means to render the first and second auxiliary liquid chambers incapable of expansion or shrinkage, the flow of the liquid can be prevented, and the spring constant of the vibration isolator can be increased. Consequently, when the engine is stopped or started, it is possible to prevent the engine from rolling or undergoing large vibrations due to changes in the engine torque.

The other objects, features and advantages of the present invention will become more apparent from the following detailed description of the invention when read in conjunction with the accompanying drawings.

BRIEF DESCRIPTION OF THE DRAWINGS

FIG. 3 is a side cross-sectional view of a second embodiment of the present invention;

FIG. 10A is a side cross-sectional view of a fifth embodiment of the present invention;

FIG. 10B is a cross-sectional view taken along line 10B—10B of FIG. 10A;

DETAILED DESCRIPTION OF THE PREFERRED EMBODIMENTS

Figure 1:
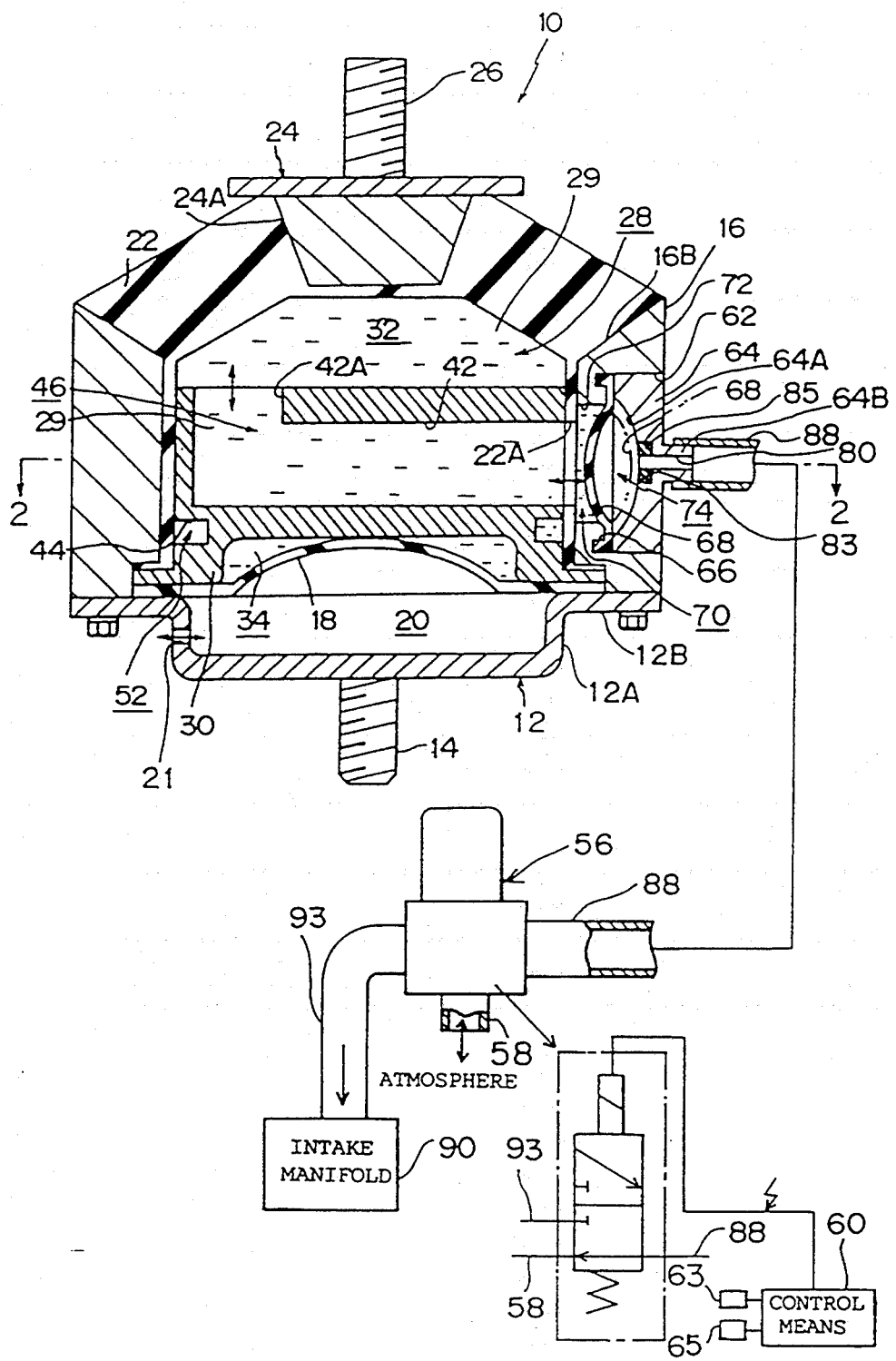
FIG. 1 is a side cross-sectional view of a first embodiment in which the present invention is applied to an automobile engine.
Figure 2:
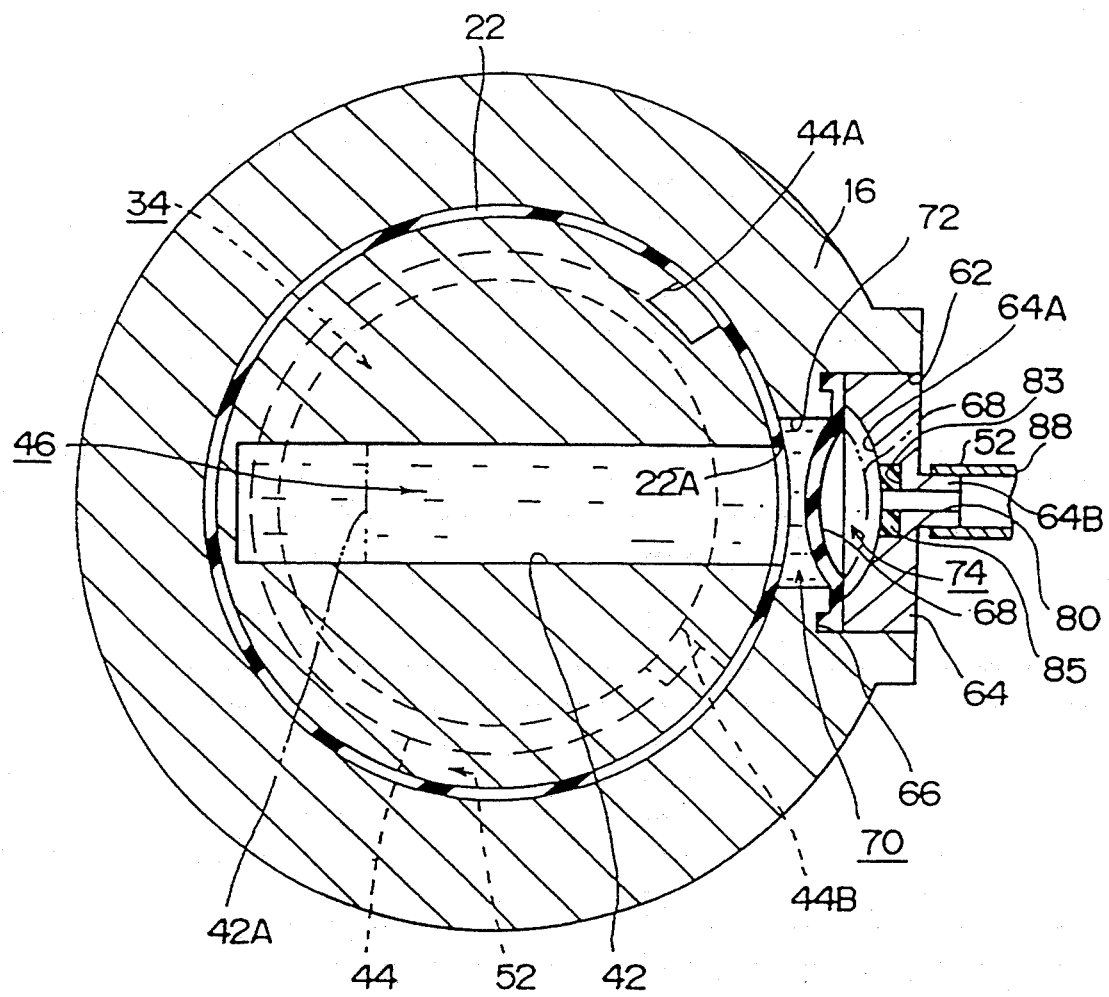
FIG. 2 is a cross-sectional view, taken along line 2—2 of FIG. 1, of a partition member shown in FIG. 1.

Referring to FIGS. 1 and 2, a description will be given of a first embodiment of a vibration isolator 10 in accordance with the present invention.

As shown in FIG. 1, this vibration isolator 10 has a bottom plate 12. This bottom plate 12 has a mounting bolt 14 which projects downward from a center thereof. The bottom plate 12 is secured to, for example, a chassis of an unillustrated automobile. A peripheral portion of the bottom plate 12 is formed as a cylindrical, upright wall portion 12A bent orthogonally upward. A flange 12B bent orthogonally in such a manner as to extend horizontally is formed continuously at an upper end of the upright wall portion 12A.

An outer cylinder 16 of a large wall thickness, which serves as a hollow cylindrical member, is bolted to the flange 12B of the bottom plate 12, and peripheral edges of both a partition member 30 and a diaphragm 18 serving as a first diaphragm are clamped by and held between the flange 12B and a lower end of the outer cylinder 16. A space defined by the diaphragm 18 and the bottom plate 12 is formed as an air chamber 20 serving as a first air chamber, and communicates with the outside via an air hole 21 formed in the upright wall portion 12A.

An upper end of an inner peripheral surface of the outer cylinder 16 is formed as a slanting-surface portion 16B whose inner diameter is gradually expanded, and an outer periphery of a resilient member 22 is vulcanized to the slanting-surface portion 16B. In addition, part of the resilient member 22 extends to a portion of the lower end of the inner periphery of the outer cylinder 16 and is vulcanized thereto.

An outer periphery of a support base 24 serving as a mounting member is vulcanized to a central portion of this resilient member 22. This support base 24 is a mounting portion for an unillustrated engine, and a mounting bolt 26 for fixing the engine is disposed uprightly on the support base 24.

A liquid chamber 28 is formed by an inner peripheral portion of the outer cylinder 16, a lower end portion of the resilient member 22, and the diaphragm 18, and a liquid 29 such as ethylene glycol is filled in this liquid chamber 28.

The aforementioned partition member 30 is disposed in the liquid chamber 28 to partition the liquid chamber 28 into a main liquid chamber 32 and a first auxiliary liquid chamber 34. This partition member 30 is formed of a synthetic resin or the like and is shaped substantially in the form of a hat.

As shown in FIGS. 1 and 2, a narrow groove 44 having a rectangular cross section and configured in the shape of the letter C as viewed in the axial direction is formed in an outer periphery of the partition member 30. This narrow groove 44 is closed on the outer cylinder 16 side thereof by an extension of the resilient member 22, thereby forming a first limiting passage 52. One longitudinal end of this first limiting passage communicates with the main liquid chamber 32 via a rectangular opening 44A, and the other end thereof communicates with the first auxiliary liquid chamber 34 via an opening 44B.

Furthermore, the partition member 30 is provided with a rectangular hole 42 extending horizontally from one portion of the outer periphery thereof toward a diametrically opposite portion thereof, as shown in FIG. 1. Furthermore, a distal end of this rectangular hole 42 is bent upward to communicate with the main liquid chamber 32 via an opening 42A, thereby constituting a second limiting passage 46. This second limiting passage 46 has a shorter overall length and a larger cross-sectional area than the first limiting passage 52, and has a smaller liquid passage resistance than the first limiting passage 52.

Meanwhile, a recessed portion 62 is formed in the outer periphery of the outer cylinder 16 at a position corresponding to the rectangular hole 42, and this recessed portion 62 is closed by a block 64. A through hole 72 is formed at the bottom of the recessed portion 62, and this through hole 72 communicates with the rectangular hole 42 via a hole 22A formed through the resilient member 22.

An annular recessed portion 66 is formed in an inner periphery of the bottom of the recessed portion 62, and a peripheral edge of a diaphragm 68 serving as a second diaphragm is clamped by and held between this annular recessed portion 66 and the block 64. The diaphragm 68 in its free state projects toward the through hole 72 in a substantially semispherical shape, and the through hole 72 is closed by the diaphragm 68, thereby constituting a second auxiliary liquid chamber 70. The axial direction of this second auxiliary liquid chamber 70 is arranged in the radial direction of the outer cylinder 16. In addition, the surface of the block 64 which faces the diaphragm 68 is formed in a shape substantially symmetrical with the shape of the diaphragm 68 in its free state with the peripheral edge of the diaphragm 68 set as a plane of symmetry. In other words, the surface of the block 64 is formed as a semispherical concave portion 64A.

The space defined by this concave portion 64A and the diaphragm 68 is formed as an air chamber 74 serving as a second air chamber. A suction hole 80 communicating with the air chamber 74 is formed in the center of the block 64, and this suction hole 80 communicates with the outer side of the block 64 via a pipe portion 64B. In the block 64, an annular groove 83 is formed in an opening of the suction hole 80 on the air chamber 74 side, and an annular soft, resilient ring 85 is secured in this annular groove 83.

One end of a pipe 88 is connected to the pipe portion 64B, and the other end of the pipe 88 is connected to a three-port two-position changeover valve 56. Connected to this three-port two-position changeover valve 56 in addition to the pipe 88 are one end of a pipe 93 and one end of an atmosphere-communicating pipe 58. The other end of the pipe 93 is connected to an intake manifold 90 serving as a negative-pressure means, and the other end of the atmosphere-communicating pipe 58 communicates with the atmosphere. The three-port two-position changeover valve 56 is electrically connected to a control means 60, and a changeover thereof is controlled by the control means 60. For this reason, when the pipe 88 and the intake manifold 90 are made to communicate with each other by the three-port two-position changeover valve 56, the interior of the air chamber 74 is set under negative pressure, and when the pipe 88 and the atmosphere-communicating pipe 58 are made to communicate with each other by the changeover valve 56, the interior of the air chamber 74 is set under the same pressure as the atmospheric pressure.

The control means 60 is driven by an electric power source of the vehicle, receives detection signals from at least a vehicle-speed sensor 63 and an engine revolution sensor 65, and is hence capable of detecting the vehicle speed and the engine speed. As a result, the control means 60 is capable of determining whether the vehicle is idling or shaking.

The inside diameters of the suction hole 80, the pipe 88, and the atmosphere-communicating pipe 58 are set to be 2.5 mm or more so that the air can easily move into or out of the air chamber 74.

The operation of this embodiment will be described hereafter.

If the bottom plate 12 of this vibration isolator 10 is fixed to, for instance, the chassis of a vehicle such as an automobile, and the engine is mounted and secured on the support base 24, the vibrations of the engine are supported by the chassis of the automobile via the support base 24, the resilient member 22, the outer cylinder 16, and the bottom plate 12. The vibrations are thus absorbed by resistance based on the internal friction of the resilient member 22.

In addition, when the vehicle travels at 70–80 km/h, shaking vibrations (15 Hz or less) occur. The control means 60 determines by means of the vehicle speed sensor 63 and the engine revolution sensor 65 whether or not the shaking vibrations are occurring. Upon determining that the shaking vibrations are occurring, the control means 60 changes over the three-port two-position changeover valve 56 to allow the pipe 88 and the intake manifold 90 to communicate with each other. As a result, the interior of the air chamber 74 is set under negative pressure, so that the diaphragm 68 is brought into close contact with the inner peripheral surface of the concave portion 64A of the block 64, as indicated by a two-dotted chain line in FIG. 1. At this time, since the concave/convex state of the diaphragm 68 is reversed with the peripheral edge thereof serving as a boundary, the diaphragm 68 can be brought reliably into close contact with the inner peripheral surface of the concave portion 64A without any occurrence of cracks or the like. Consequently, the second auxiliary liquid chamber 70 becomes incapable of expansion or shrinkage, so that the liquid 29 ceases to flow in the second limiting passage 46. Accordingly, the liquid 29 flows only through the first limiting passage 52 between the main liquid chamber 32 and the first auxiliary liquid chamber 34. The shaking vibrations are effectively absorbed by the resistance and liquid-column resonance occurring when the liquid 29 passes through the first limiting passage 52. It should be noted that when the diaphragm 68 is brought into close contact with the inner peripheral surface of the concave portion 64A, the diaphragm 68 corresponding to the opening of the suction hole 80 abuts against the soft resilient ring 85. Hence, the diaphragm 68 is prevented from being impressed by the mark of the opening or from being damaged, so that the durability of the diaphragm 68 is improved.

Meanwhile, when the engine is idling or the vehicle speed is 5 km/h or less, idling vibrations (20–40 Hz) occur. The control means 60 determines by means of the vehicle speed sensor 63 and the engine revolution sensor 65 whether or not the idling vibrations are occurring. Upon determining that the idling vibrations are occurring, the control means 60 changes over the three-port two-position changeover valve 56 to allow the pipe 88 and the atmosphere-communicating pipe 58 to communicate with each other. As a result, the interior of the air chamber 74 is set under the same pressure as the atmospheric pressure. Hence, the diaphragm 68 moves away from the inner peripheral surface of the concave portion 64A of the block 64, as indicated by a solid line in FIG. 1, so that the second auxiliary liquid chamber 70 capable of expansion and shrinkage is formed. Therefore, even if the first limiting passage 52 becomes clogged by the idling vibrations, the liquid 29 passes through the second limiting passage having a greater channel area and flows between the main liquid chamber 32 and the second auxiliary liquid chamber 70, The liquid 29 undergoes liquid-column resonance in the second limiting passage 46, thereby reliably absorbing the idling vibrations.

In this embodiment, as the diaphragm 68 is brought into close contact with and fixed to the inner peripheral surface of the concave portion 64A by the negative pressure resulting from the intake by the intake manifold 90, the second limiting passage 46 is virtually closed. Accordingly, the interior of the vibration isolator 10 does not become complicated as compared with the conventional vibration isolator in which the limiting passages are changed over by using a changeover valve. In addition, since there are no rotating or sliding portions, the seal for the liquid can be arranged simply. Thus, the overall arrangement of the vibration isolator 10 is made simple.

Referring to FIG. 3, a description will be given of a second embodiment of the vibration isolator 10 in accordance with the present invention.

In this embodiment, the air hole 21 formed in the bottom plate 12 in the first embodiment is omitted, and a suction hole 87 is formed instead. One end of a pipe 89 is connected to this suction hole 87, and the other end of the pipe 89 is connected to a three-port two-position changeover valve 57. In addition to the pipe 89, one end of a pipe 95 and one end of an atmosphere-communicating pipe are connected to this three-port two-position changeover valve 57. The other end of this pipe 95 is connected to the intake manifold 90 serving as the negative-pressure means, and the other end of the atmosphere-communicating pipe 59 communicates with the air. This three-port two-position changeover valve 57 is electrically connected to the control means 60 in the same way as the three-port two-position changeover valve 56. For this reason, if the three-port two-position changeover valve 57 allows the pipe 89 and the intake manifold 90 to communicate with each other, the interior of the air chamber 20 is set under negative pressure, and if the pipe 89 and the atmosphere-communicating pipe 59 are made to communicate with each other, the interior of the air chamber 20 is set under the same pressure as the atmospheric pressure.

In this embodiment, when the engine is stopped or started, the control means 60 changes over the three-port two-position changeover valves 56 and 57 to allow the air chambers 20 and 74 to communicate with the intake manifold 90. The interiors of the air chambers 20 and 74 are consequently set under negative pressure, and the diaphragm 68 is brought into close contact with the inner peripheral surface of the concave portion 64A of the block 64, as indicated by the two-dotted chain line in FIG. 3. On the other hand, the diaphragm 18 is brought into close contact with the inner peripheral surface of the bottom plate 12, as indicated by the two-dotted chain line in FIG. 3. As a result, the first and second auxiliary liquid chambers 34 and 70 become incapable of expansion and shrinkage, so that the liquid 29 ceases to flow through the first and second limiting passages 52 and 46. Consequently, the spring constant of the vibration isolator 10 becomes high, so that it is possible to prevent the rolling or large vibration of the engine due to fluctuations of torque when the engine is stopped or started. In addition, not only when the engine is stopped or started, but also during vibration with very low frequencies (e.g., during the very low-speed rotation of the engine), the first and second auxiliary liquid chambers 34 and 70 may be made incapable of expansion and shrinkage so as to increase the spring constant of the vibration isolator 10, thereby preventing the vibration of the engine.

During the shaking vibrations and idling vibrations, the control means 60 changes over the three-port two-position changeover valve 57 to allow the air chamber 20 to communicate with the atmosphere. As a result, the interior of the air chamber 20 is set under the same pressure as the atmospheric pressure, and the diaphragm 18 moves away from the inner peripheral surface of the bottom plate 12, as indicated by the solid line in FIG. 3. Hence, the first auxiliary liquid chamber 34 becomes capable of expansion and shrinkage, so that the liquid 29 flows through the first limiting passage 52. The other aspects of the operation are similar to those of the first embodiment. In this embodiment as well, as the diaphragm 18 is brought into close contact with and fixed to the inner peripheral surface of the bottom plate 12 by the negative pressure resulting from the intake by the intake manifold 90, the first limiting passage 52 is virtually closed. Accordingly, in this embodiment as well, the interior of the vibration isolator 10 can be simplified as compared with the conventional vibration isolator in which the limiting passages are changed over by using a changeover valve.

In the foregoing embodiments, the arrangement provided is such that the intake manifold 90 of the engine is used as the negative-pressure means, but the present invention is not limited to the same, and a negative-pressure means such as a suction pump may be provided separately. This also applies to the other embodiments which are described hereafter.

Figure 4:
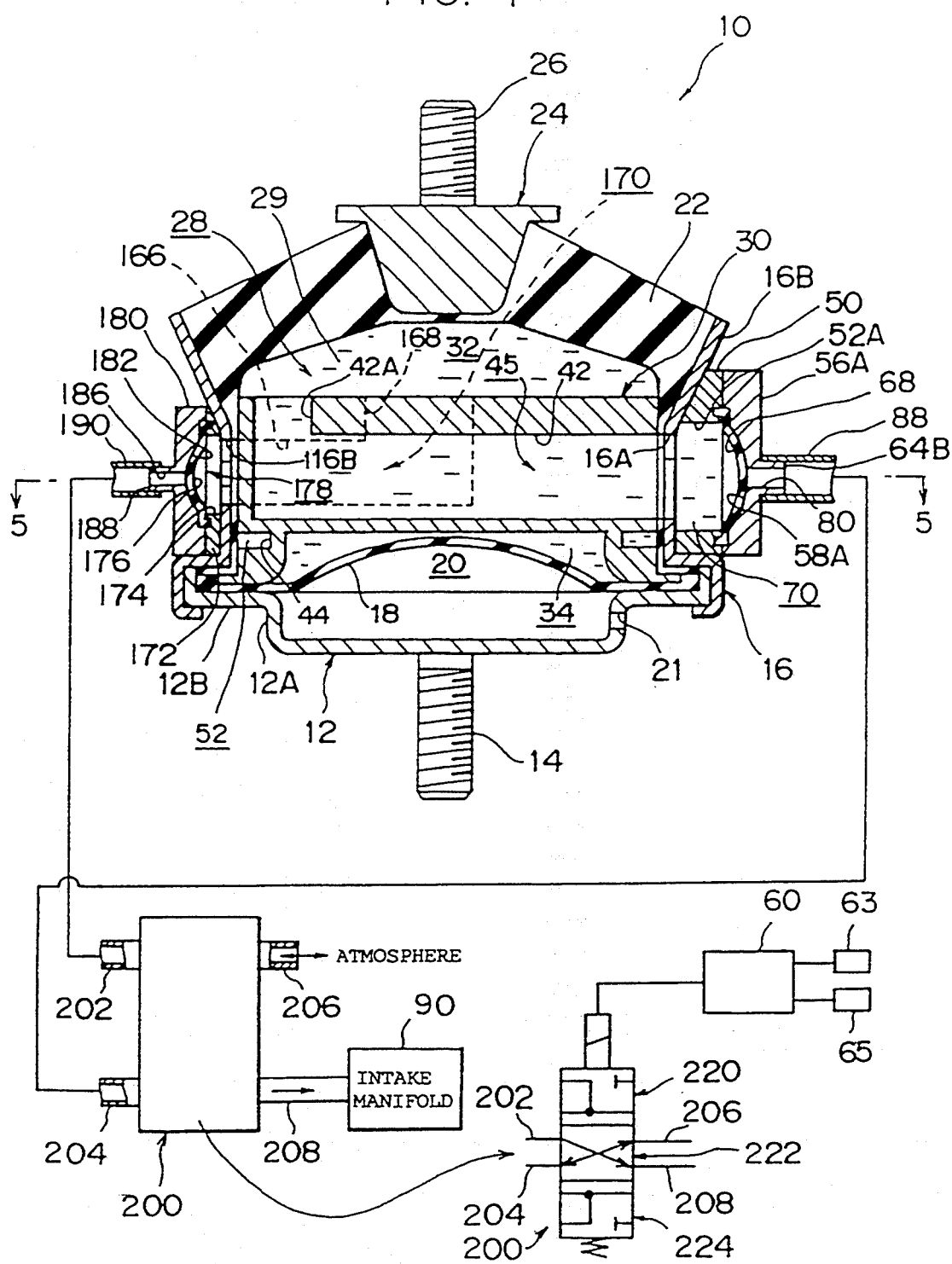
FIG. 4 is a side cross-sectional view of a third embodiment of the present invention.

Referring to FIGS. 4 to 7, a description will be given of a third embodiment of the vibration isolator 10 in accordance with the present invention. As shown in FIG. 4, the outer cylinder 16 in this embodiment is provided with a small wall thickness.

The lower end portion of the outer cylinder 16 is caulked and fixed to the flange 12B of the bottom plate 12, an the peripheral edge of the first diaphragm 18 is clamped by and held between the flange 12B and the lower end portion of the outer cylinder 16.

A hole 16A is provided in the outer cylinder 16 in face-to-face relation with an outer peripheral-side opening of the second limiting passage 46, and a boss 50 is secured to the outer periphery of the outer cylinder 16 in correspondence with the hole 16A. A circular hole 52A is provided in this boss 50 in correspondence with the hole 16A. The side of this circular hole 52A away from the outer cylinder 16 side thereof is closed by the second diaphragm 68, and the space defined by the second diaphragm 68 and the outer cylinder 16 serves as the second auxiliary liquid chamber 70. It should be noted that the peripheral edge of the second diaphragm 68 is clamped by and held between the boss 50 and a closure member 56A. The second diaphragm 68 in a free state is made convex with a substantially semispherical shape projecting toward the circular hole 52A, as shown in FIG. 5.

A substantially semispherical concave portion 58A is formed on the side of the closure member 56A opposing the second diaphragm 68, and the space defined by the second diaphragm 68 and the concave portion 58A serves as the second air chamber 74 and communicates with the pipe 88.

Figure 5:
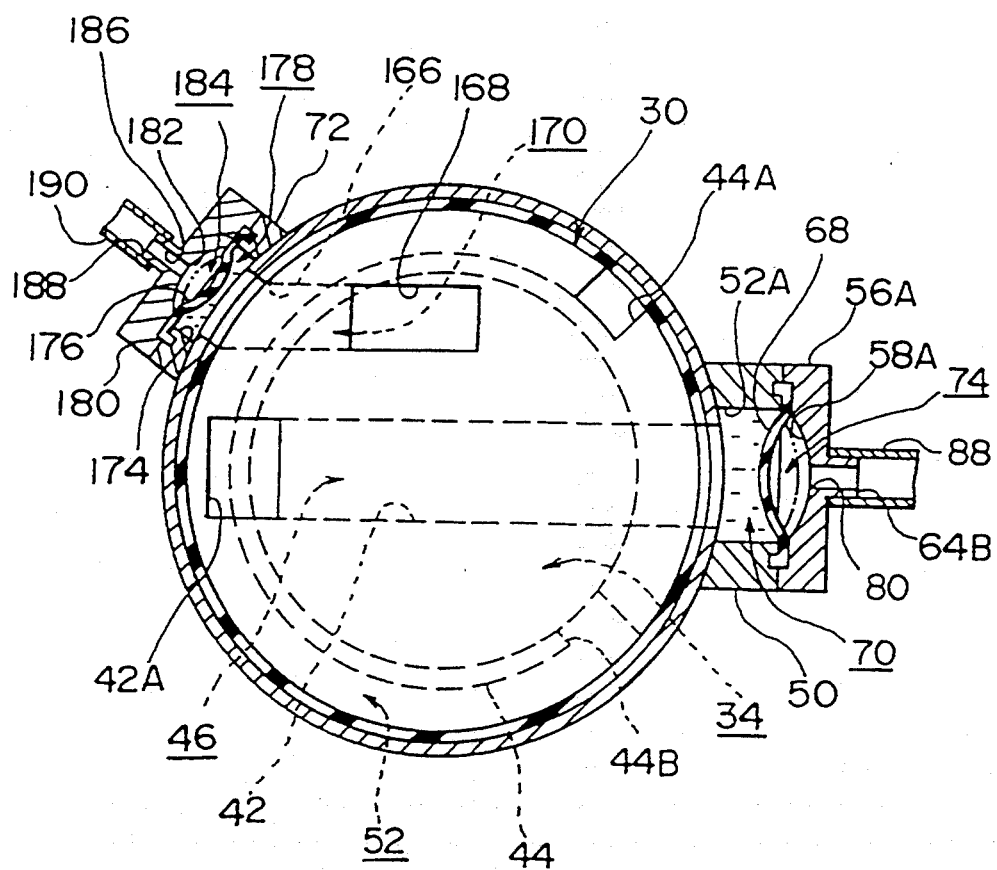
FIG. 5 is a cross-sectional view taken along line 5—5 of FIG. 4.

As shown in FIG. 5, the partition member 30 is provided with a rectangular hole 166 parallel with the aforementioned rectangular hole 42. One end of this rectangular hole 166 is open in the outer periphery of the partition member 30, and the other end thereto is open to the main liquid chamber 32 via an opening 168, thereby constituting a third limiting passage 170 for absorbing high-frequency vibrations. It should be noted that the overall length of this third limiting passage 170 is made shorter than that of the second limiting passage 46, and the resonance frequency of the liquid in the third limiting passage 170 is made higher than that in the second limiting passage 46.

Meanwhile, a hole 116B is provided in the outer cylinder 16 in-face-to-face relation with the outer periphery-side opening of the third limiting passage 170, and a boss 172 is secured to the outer periphery of the outer cylinder 16 in correspondence with the hole 116B. This boss 172 is provided with a circular hole 174 communicating with the hole 116B. The side of the circular hole 174 away from the outer cylinder 16 side thereof is closed by a third diaphragm 176, and the space defined by the third diaphragm 176 and the outer cylinder 16 is formed as a third auxiliary liquid chamber 178. A peripheral edge of the third diaphragm 176 is clamped by and held between the boss 172 and a closure member 180, and the third diaphragm 176 in a free state is made convex with a substantially semispherical shape projecting toward the circular hole 174, as indicated by the solid line in FIG. 5. It should be noted that the third diaphragm 176 is provided with higher rigidity with respect to the hydraulic pressure than the second diaphragm 68 facing the second auxiliary liquid chamber 70. In addition, a substantially semispherical concave portion 182 is formed on the side of the closure member 180 facing the third diaphragm 176, and the space defined by the third diaphragm 176 and the concave portion 182 is formed as a third air chamber 184. In addition, a hole 186 is formed in a central portion of the concave portion 182, and an outer end of this hole 186 communicates with a tip of a connecting pipe 188 formed on the outer side of the closure member 180.

As shown in FIG. 4, one end of a pipe 190 is connected to the connecting pipe 188, and the other end of this pipe 190 is connected to a four-port three-position changeover valve 200.

Connecting pipes 202, 204, 206, and 208 are respectively connected to the four-port three-position changeover valve 200, and the other end of the pipe 190 is connected to the connecting pipe 202, while the other end of the pipe 88 is connected to the connecting pipe 204. In addition, the other end of the connecting pipe 208 is connected to the intake manifold 90 of the unillustrated engine, the intake manifold 90 serving as the negative-pressure means. The other end of the connecting pipe 206 communicates with the atmosphere.

The four-port three-position changeover valve 200 is adapted to be changed over in three stages. Specifically, at a first changeover position 220, the connecting pipes 202, 204, and 208 are made to communicate with one another. At a second changeover position 222, the connecting pipes 202 and 208 are made to communicate with each other, and the connecting pipes 204 and 206 are made to communicate with each other. At a third changeover position 224, the connecting pipes 202, 204, and 206 are made to communicate with one another.

Accordingly, when the four-port three-position changeover valve 200 is changed over to the first changeover position 220, the second and third air chambers 74 and 184 are made to communicate with the intake manifold 90 and their interiors are set under negative pressure. When the four-port three-position changeover valve 200 is changed over to the second changeover position 222, the third air chamber 184 is made to communicate with the intake manifold 90 and its interior is set under negative pressure; on the other hand, the second air chamber 74 is made to communicate with the atmosphere and its interior is set under the same pressure as the atmospheric pressure. When the four-port three-position changeover valve 200 is changed over to the third changeover position 224, both the second and third air chambers 74 and 184 are made to communicate with the atmosphere, and their interiors are set under the same pressure as the atmospheric pressure.

The four-port three-position changeover is electrically connected to the control means 60, and a changeover thereof is controlled by the control means 60. The control means 60 is electrically connected to at least the vehicle-speed sensor 63 and the engine revolution sensor 65, and the control means 60 receives detection signals from these sensors. The control means 60 is hence capable of determining the vibrating condition of the vehicle (the state of idling vibration, the state of shaking vibration, or the state of high-frequency vibration) by detecting the vehicle speed and the engine speed.

The operation of this embodiment will be described hereafter.

When the control means 60 determines that the shaking vibrations are occurring, the control means 60 changes over the four-port three-position changeover valve 200 to the first changeover position 220. As a result, the interiors of the second and third air chambers 74 and 184 are set under negative pressure, so that the second and third diaphragms 68 and 176 are brought into close contact with the inner surface of the concave portion 58A of the closure member 56A and the inner surface of the concave portion 182 of the closure member 180, respectively, as shown in FIG. 4. At this time, since the concave/convex state of each of the second and third diaphragms 68 and 176 is reversed with the respective peripheral edge serving as a boundary, the second and third diaphragms 68 and 176 are brought reliably into contact with the inner surfaces of the concave portions 58A and 182, respectively, without any occurrence of cracks or the like. Consequently, the second and third auxiliary liquid chamber 70 and 178 become incapable of expansion or shrinkage, so that the liquid 29 ceases to flow in the second and third limiting passages 46 and 170. Accordingly, the liquid 29 flows only through the first limiting passage 52. Hence, a large loss factor is obtained by the resistance and liquid-column resonance occurring when the liquid 29 flows through the first limiting passage 52, thereby allowing the shaking vibrations to be effectively absorbed.

Figure 6:
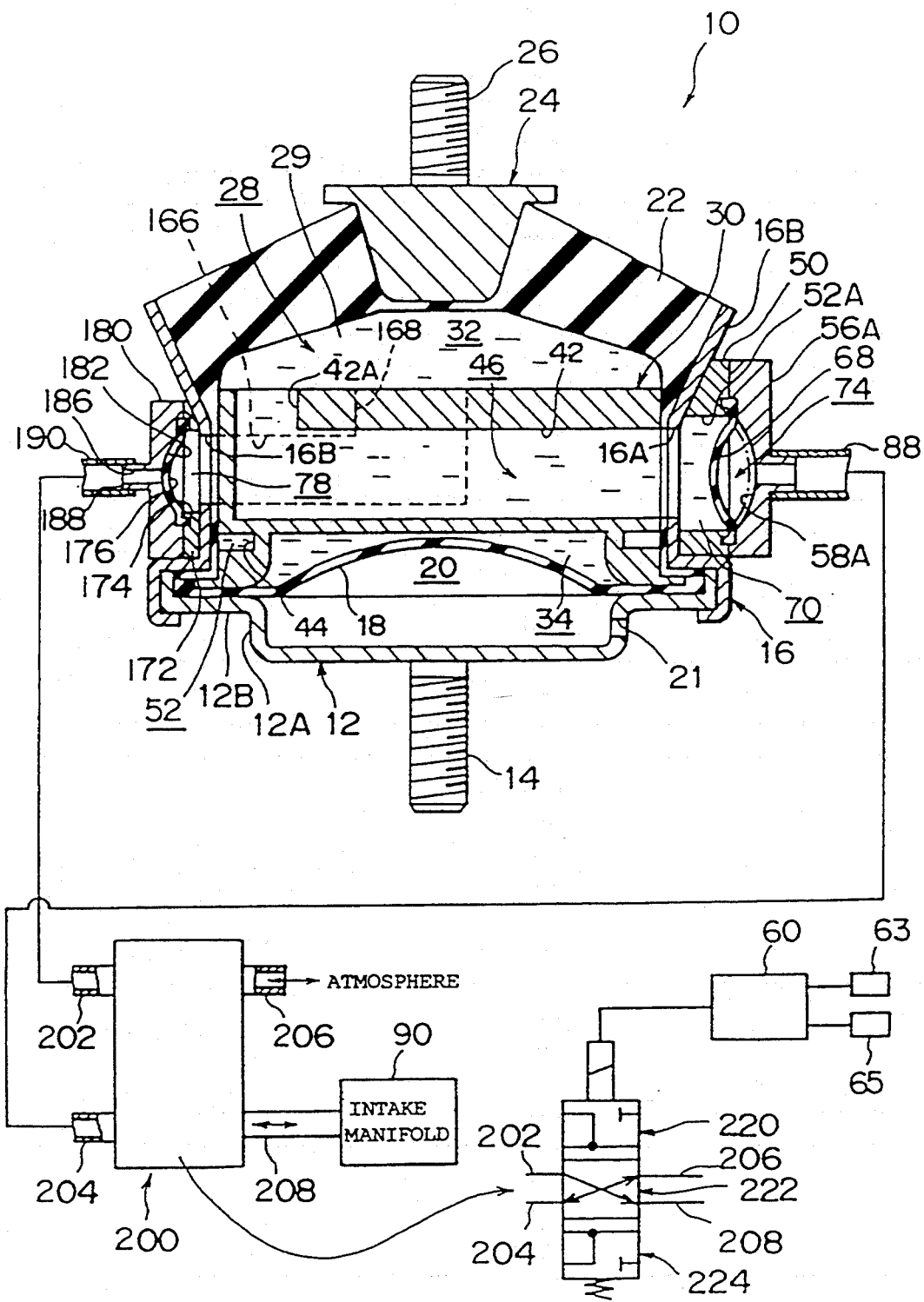
FIG. 6 is a diagram illustrating an operating condition of a vibration isolator shown in FIG. 4.

Upon determining that the idling vibrations are occurring, the control means 60 changes over the four-port three-position changeover valve 200 to the second changeover position 222. As a result, the interior of the second air chamber 74 is set under the same pressure as the atmospheric pressure. Then, as shown in FIG. 6, the concave/convex state of the second diaphragm 68 is reversed, and the second diaphragm 68 moves away from the inner surface of the concave portion 58A of the closure member 56A, thereby forming the expandable and shrinkable second auxiliary liquid chamber 74. As a result, even if the first limiting passage 52 becomes clogged by the idling vibrations, the liquid 29 is capable of passing through the second limiting passage 46 and flowing between the main liquid chamber 32 and the second auxiliary liquid chamber 70. Accordingly, the liquid 29 undergoes liquid-column resonance in the second limiting passage 46 and the dynamic spring constant is thereby lowered, so that the idling vibrations are effectively absorbed.

In addition, when the vehicle speed is 100 km/h or more and the engine speed is 3000 rpm or more, high-frequency vibrations (e.g., 80 Hz or more) occur.

Figure 7:
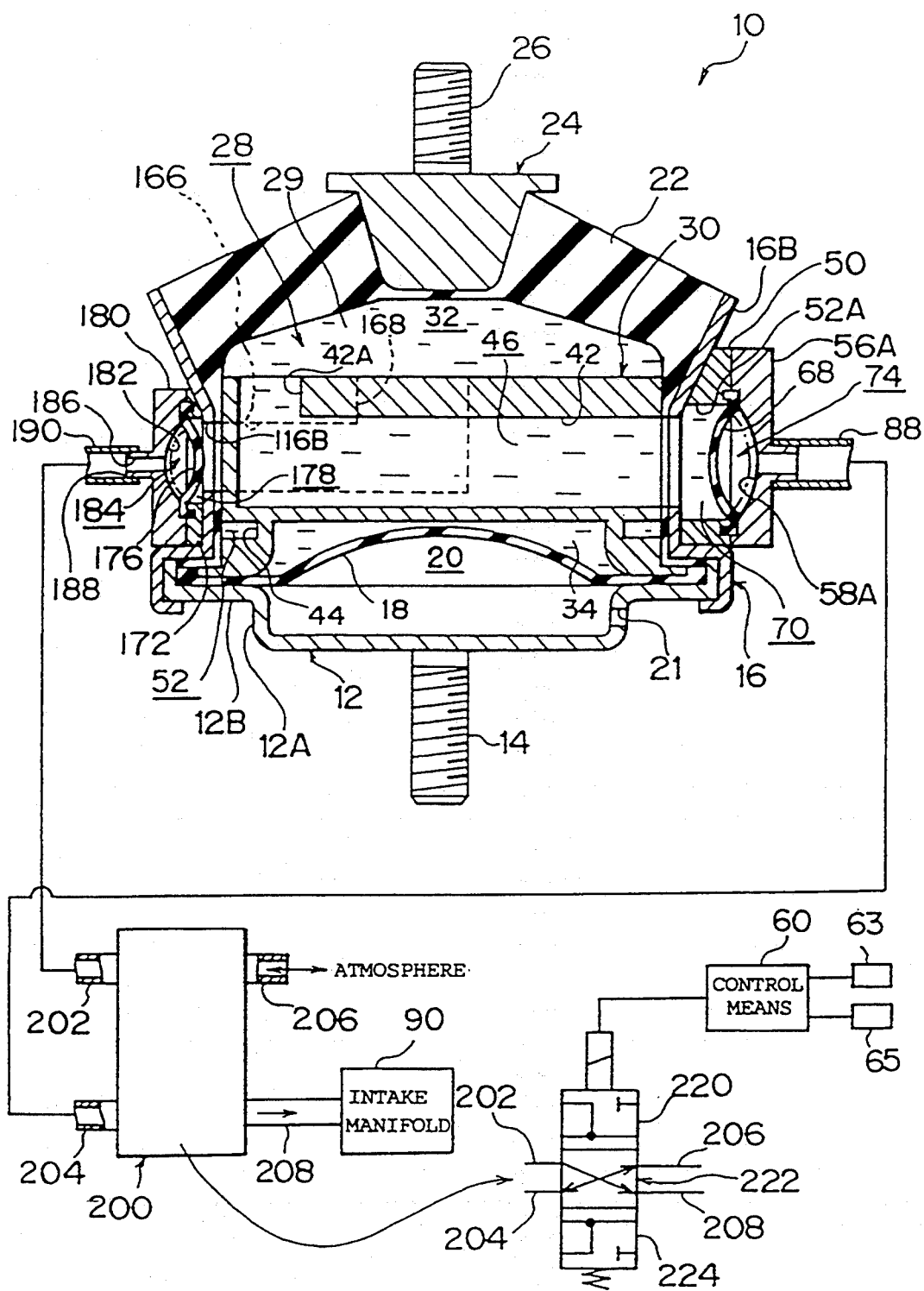
FIG. 7 is a diagram illustrating another operating condition of the vibration isolator shown in FIG. 4.

The control means 60 determines through the vehicle-speed sensor 63 and the engine revolution sensor 65 whether or not the high-frequency vibrations are occurring. Upon determining that the high-frequency vibrations are occurring, the control means 60 changes over the four-port three-position changeover valve 200 to the third changeover position 224. as a result, the interior of the third air chamber 184 is set under the same pressure as the atmospheric pressure and, as shown in FIG. 7, the concave/convex state of the third diaphragm 176 is reversed, so that the third diaphragm 176 moves away from the inner surface of the concave portion 182 of the closure member 180, thereby forming the expandable and shrinkable third auxiliary liquid chamber 178. As a result, even if the second limiting passage 46 becomes clogged by the high-frequency vibrations, the liquid 29 is capable of passing through the third limiting passage 170 and flowing between the main liquid chamber 32 and the third auxiliary liquid chamber 178. Accordingly, the liquid 29 undergoes liquid-column resonance in the third limiting passage 170 and the dynamic spring constant is thereby lowered, so that the high-frequency vibrations are effectively absorbed.

Figure 8:
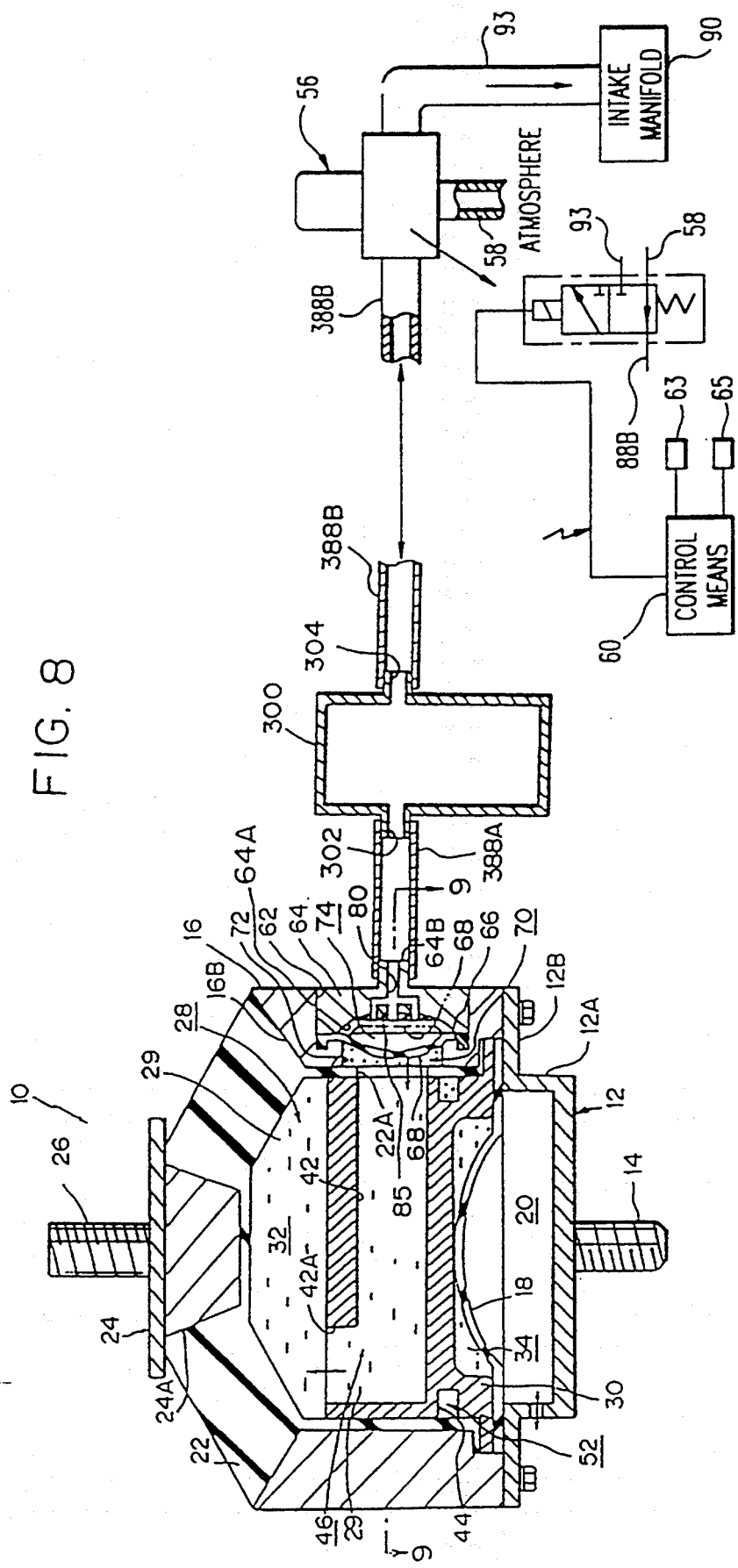
FIG. 8 is a side cross-sectional view of a fourth embodiment of the present invention.
Figure 9:
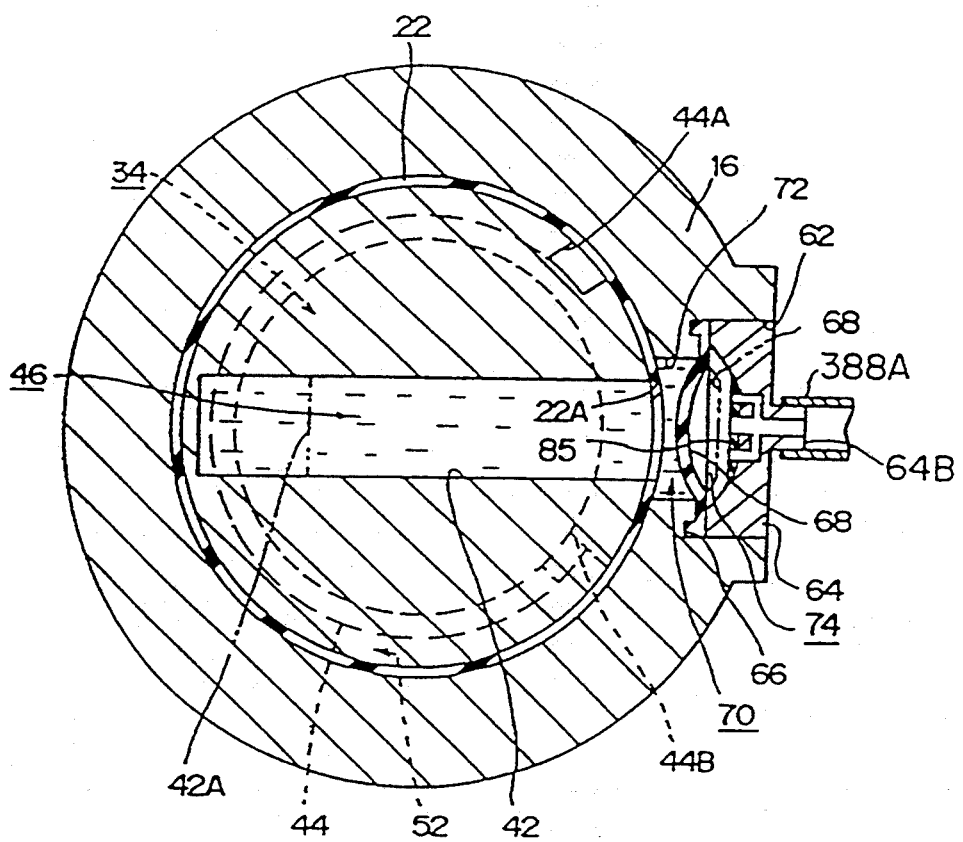
FIG. 9 is a cross-sectional view taken along line 9—9 of FIG. 8.

Referring now to FIGS. 8 and 9, a description will be given of a fourth embodiment of the present invention. In this embodiment, a central portion of the substantially semispherical concave portion 64A facing the second air chamber 74 is formed in a planar shape. One end of the suction hole 80 is branched into a plurality of ports, and a soft resilient sheet 85 is secured to the flat portion of the concave portion 76 excluding the opening portions of the suction hole 80, so as to protect the second diaphragm 68. It should be noted a the maximum capacity of the air chamber 74 (the capacity of the diaphragm 68 in a free state indicated by the solid line in FIG. 8) in this embodiment is set to be 3 cm³.

As shown in FIG. 8, this vibration isolator 10 is provided with an air tank 300 which serves as an auxiliary air chamber and is located adjacent the pipe portion 64B. This air tank 300 is formed of a metal plate or a resin of a large wall thickness, and its rigidity is therefore made high so that its wall will not be deformed by changes in the internal pressure thereof so as to prevent a change in its capacity. A pair of connecting pipes 302 and 304 are respectively connected to radially opposing portions of the peripheral wall of the air tank 300 in such a manner as to communicate with each other. It should be noted that the capacity of this air tank 300 is preferably set to at least not less than five times the maximum capacity of the aforementioned air chamber 74 (the capacity when the diaphragm 68 is set in a free state, as shown by the solid line in FIG. 8). In this embodiment, the capacity is set to, for example, 20 cm³.

One end of a hose 388A formed of a resilient material such as rubber is connected to the connecting pipe 302 of the air tank 300, and the other end of the hose 388A is connected to the aforementioned pipe portion 64B. It should be noted that the length of this hose 388A is preferably as short as possible. If required, the hose 388A may be omitted, and the connecting pipe 302 and the pipe portion 64B may be connected directly to each other.

Meanwhile, one end of a hose 388B formed of a resilient material such as rubber is connected to the connecting pipe 304 of the air tank 300, and the other end of this hose 388B is connected to the changeover valve 56.

Accordingly, in this embodiment, when the second auxiliary liquid chamber 70 undergoes expansion and shrinkage, since the air tank 300 is disposed in the vicinity of the air chamber 74, even if the internal resistance of the three-port two-position changeover valve 56 and the resistance of the hose 388B are present, the air inside the air chamber 74 can move to and from the air tank 300. In other words, since the volumetric change in the air tank 300 is relatively smaller than the volumetric change in the air chamber 74, the pressure change inside the air tank 300 is small, so that the air can move into and out of the air chamber 74 without being practically subjected to resistance. Therefore, the expansion and shrinkage of the second auxiliary liquid chamber 70 is not hampered, and the liquid-column resonance occurs effectively in the second limiting passage 46. Thus the dynamic spring constant drops sufficiently, so that the idling vibrations are absorbed effectively.

FIGS. 10A and 10B show an auxiliary air chamber in accordance with a fifth embodiment of the present invention. This auxiliary air chamber is arranged such that the air tank 300 located between the hose 388A and the three-port two-position changeover valve 56 in the foregoing embodiment is omitted, and an enlarged-diameter member 396 serving as an auxiliary air chamber is disposed midway in the hose 388B, as shown in FIG. 10A. A plurality of ribs 398 extending in the longitudinal direction of the hose 388B are formed in circumferentially spaced-apart relation with each other on the outer periphery of the enlarged-diameter member 396 (see FIG. 10B). These ribs 398 prevent the deformation of the enlarged-diameter member 396 when the interior of the enlarged-diameter portion 396 is set under negative pressure. The configuration of the ribs 398 and the number thereof to be provided are not restricted to the above-described configuration and the number illustrated in FIG. 10B. In addition, an arrangement may be provided such that the wall thickness of the enlarged-diameter portion 396 is made large so as to increase the rigidity of the enlarged-diameter portion 396, thereby to prevent the deformation thereof.

Although, in the fourth embodiment, the air tank 300 is connected to the vibration isolator 10 via the hose 388A, the present invention is not limited to the same, and an arrangement may be alternatively provided such that the air tank 300 is directly attached to the outer wall of the outer cylinder 16, and the hose 388A is omitted.

In addition, although in the vibration isolator 10 of the foregoing embodiments the air tank or the auxiliary air chamber is arranged to be connected to the air chamber facing the second auxiliary liquid chamber, the present invention is not limited to the same. For instance, an arrangement may be alternatively provided such that the air chamber is provided in face-to-face relation with the main liquid chamber, and the air tank or the auxiliary air chamber is connected to the air chamber.

Figure 11:
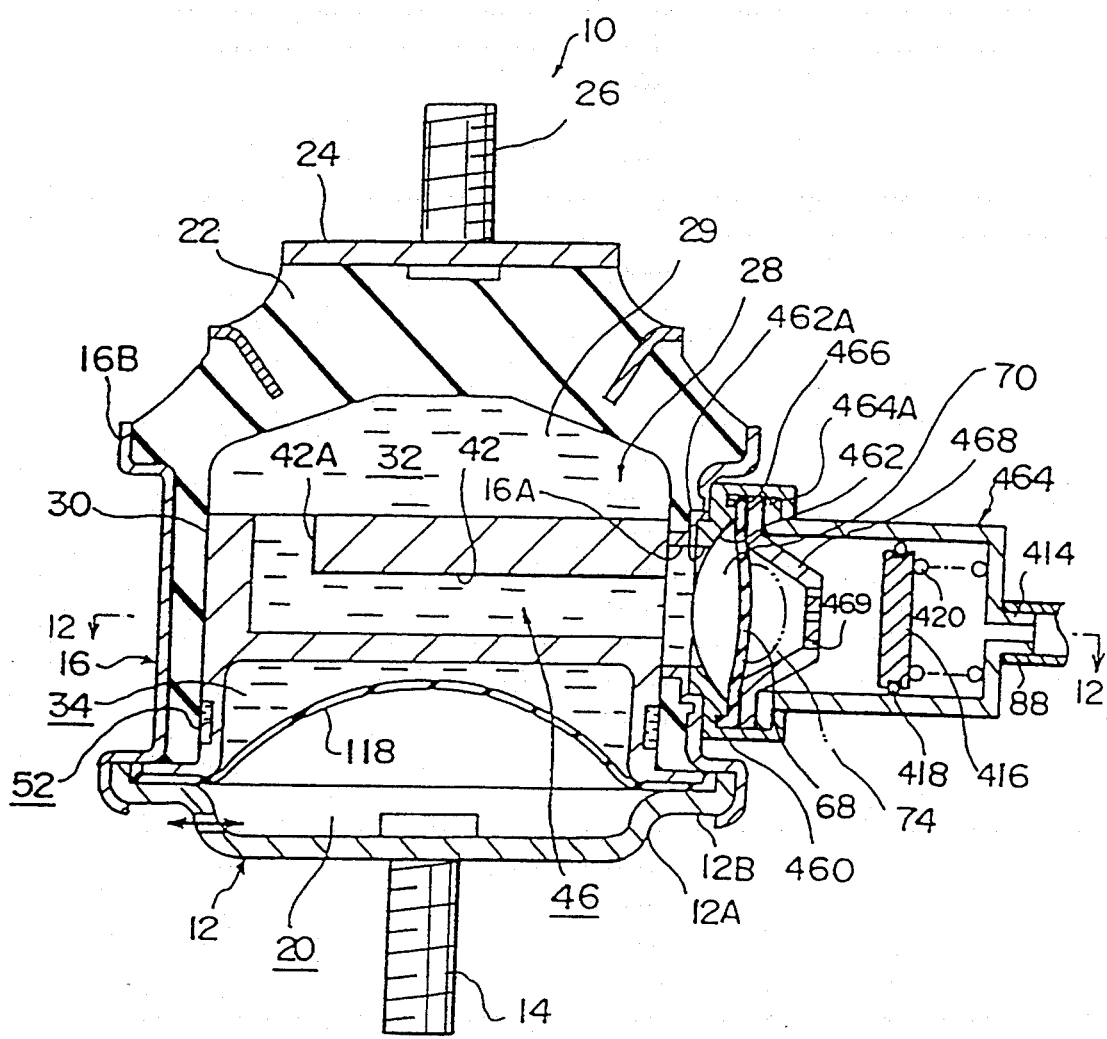
FIG. 11 is a side cross-sectional view of a sixth embodiment of the present invention.
Figure 12:
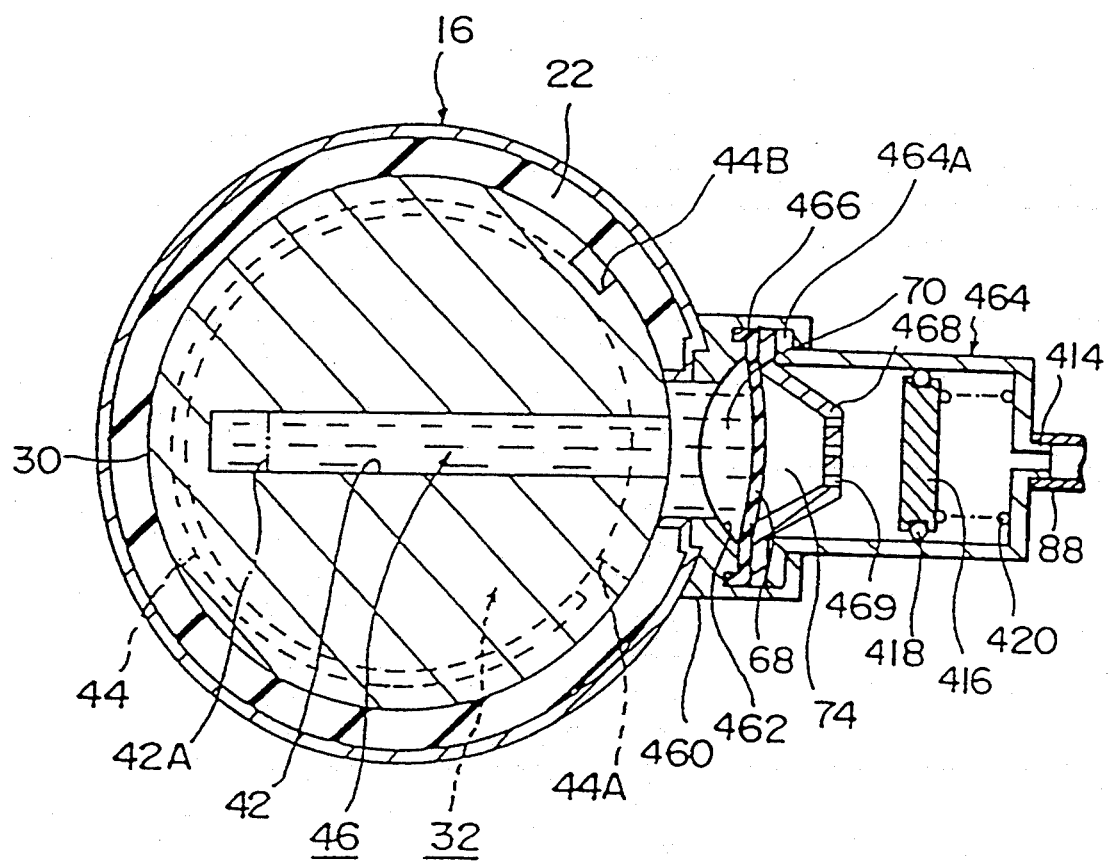
FIG. 12 is a cross-sectional view taken along line 12—12 of FIG. 11.

FIGS. 11 and 12 show a sixth embodiment of the present invention. In this embodiment, in the same way as in the third embodiment, the outer cylinder 16 is formed of a thin-walled cylindrical material, and the first auxiliary liquid chamber 34 and the second auxiliary liquid chamber 70, which are made to communicate with the main liquid chamber 32 via the first limiting passage 52 and the second limiting passage 46, respectively, are formed. This second auxiliary liquid chamber 70 is formed between the hole 16A of the outer cylinder 16 and an inner surface of a semispherical concave portion 462 of a boss 460 secured to a peripheral edge of the hole 16A, and the second diaphragm 68 closes the side of the second auxiliary liquid chamber 70 away from the second limiting passage 46. A hole 462A having the same diameter as the hole 16A is formed in a central portion of the concave portion 462, and reliably allows the concave portion 462 and the second limiting passage 46 to communicate with each other. A peripheral edge of a disk 468 and a flange 464A of a cylinder 464 are caulked and secured to the second diaphragm 58 by means of a portion of the boss 460. In addition, a peripheral edge of the second diaphragm 68 is accommodated in an annular recess 466 formed in the boss 460. The space defined by the disk 468 and the second diaphragm 68 serves as the second air chamber 74. In addition, a plurality of through holes 469 are formed in the disk 468 so as to allow the second air chamber 74 and the cylinder 464 to communicate with each other.

The cylinder 464 is formed of a metal plate or a resin of a large wall thickness, and its rigidity is therefore made high so that its wall will not be deformed by changes in the internal pressure thereof so as to prevent a change in its capacity. A connecting pipe 414 is provided on a portion of a peripheral wall of the cylinder 464 facing the disk 468, in such a manner as to communicate with each other.

A disk-like partition wall 416 which partitions the interior of the cylinder 464 into two parts is disposed in the cylinder 464, and this partition wall 416 is movable in the cylinder 464 in the axial direction thereof (horizontally as viewed in FIG. 11). An O-ring 418 is fitted in an annular groove formed around an outer periphery of the partition wall 416 to provide airtightness between the outer peripheral portion of the partition wall 416 and the inner peripheral surface of the cylinder 464. Accordingly, when the pipe 88 and the intake manifold (not shown) are made to communicate with each other by the three-port two-position changeover valve (not shown), the air within the connecting pipe 414-side portion of the interior of the cylinder 464 is sucked toward the intake manifold, and the interior thereof is set under negative pressure. Consequently, the partition wall 416 moves toward the connecting pipe 414, with the result that the air in the air chamber 74 is sucked into the cylinder 464 and the interior thereof is set under negative pressure. On the other hand, when the pipe 88 and the atmosphere-communicating pipe (not shown) are made to communicate with each other by the three-port two-position changeover valve (not shown), the connecting pipe 414—side portion of the interior of the cylinder 464 is set under the same pressure as the atmospheric pressure. Hence, the partition wall 416 moves toward the disk 468, with the result that the air in the disk 468—side portion of the interior of the cylinder 464 moves into the air chamber 74, thereby setting the interior of the air chamber 74 under the same pressure as the atmospheric pressure.

A coil spring 420, whose opposite ends are respectively connected to the partition wall 416 and the connecting pipe 414-side wall of the cylinder 464, is disposed between the partition wall 416 and the connecting pipe 414-side wall of the cylinder 464. When the interior of the cylinder 464 is set under the same pressure as the atmospheric pressure, the partition wall 416 is adapted to be located in a substantially central position of the cylinder 464.

The operation of this embodiment will be described hereafter.

According to the vibration isolator 10 of this embodiment, the partition wall 416 of the cylinder 464 is adapted to move through the operation of the intake manifold (not shown) and the three-port two-position changeover valve (not shown), so as to set the interior of the air chamber 74 under negative pressure or atmospheric pressure. In addition, in the event that the diaphragm 68 has been broken, the liquid 29 in the second auxiliary liquid chamber 70 flows into the cylinder 464, but the liquid 29 which has flown into the cylinder 464 is prevented from flowing into the three-port two-position changeover valve since the interior of the cylinder 464 is partitioned into two parts by means of the partition wall 416 and the O-ring 418. For this reason, it is possible to prevent the liquid 29 in the second auxiliary liquid chamber 70 from flowing into the intake manifold of the engine in the event that the diaphragm 68 is broken.

It should be noted that the first auxiliary liquid chamber 34 and the second auxiliary liquid chamber 70 may be virtually connected to each other via the third diaphragm. This third diaphragm is provided with higher rigidity with respect to the hydraulic pressure than the first and second diaphragms, and shifts the liquid-resonance frequency toward a high-frequency side as compared with the case where the second diaphragm vibrates. As a result, it is possible to cope with high-frequency vibrations which cannot be coped with the first and second limiting passages 52 and 46.

Although, in the foregoing embodiments, an arrangement is shown in which the vibration isolator 10 is used as an engine mount, the present invention is not limited to the same, and it goes without saying that the vibration isolator 10 is applicable to a carburetor mount, a body mount, or the like.

What is claimed is:

1. A vibration isolator for absorbing and attenuating vibrations from a vibration-generating portion, comprising:

a mounting member connected to one of said vibration-generating portion and a vibration-receiving portion;

a hollow cylindrical member connected to the other one of said vibration-generating portion and said vibration-receiving portion;

a resilient member connected to said mounting member, said resilient member being disposed to close one opening of said hollow cylindrical member and being adapted to be deformed during the occurrence of the vibrations;

a first diaphragm for closing another opening of said hollow cylindrical member;

a partition member disposed at an inner side of said hollow cylindrical member, said partition member partitioning an inner space of said hollow cylindrical member;

an expandable and shrinkable main liquid chamber disposed within said hollow cylindrical member between said resilient member and said partition member;

a first auxiliary liquid chamber disposed within said hollow cylindrical member between said first diaphragm and said partition member;

a first limiting passage provided in said partition member, said first limiting passage connecting said main liquid chamber and said first auxiliary liquid chamber thereby allowing communication with each other;

a first air chamber disposed facing a side of said first diaphragm opposite to a side thereof where said first auxiliary liquid chamber is disposed;

a second auxiliary liquid chamber formed within a side wall of said hollow cylindrical member;

a second diaphragm constituting a part of a partition wall of said second auxiliary liquid chamber;

a second air chamber disposed on a side of said second diaphragm opposite to a side thereof where said second auxiliary liquid chamber is disposed, said second air chamber being arranged such that when an interior thereof is set under negative pressure, said second air chamber causes said second diaphragm to be brought into close contact with an inner wall surface thereof causing said second air chamber to virtually disappear and preventing the movement of said second diaphragm;

negative-pressure means for setting the interior of said second air chamber under negative pressure;

a second limiting passage provided in said partition member, said second limiting passage connecting said main liquid chamber and said second auxiliary liquid chamber thereby allowing communication with each other; and a third auxiliary liquid chamber communicating with said main liquid chamber and located adjacent a third air chamber, wherein said third auxiliary liquid chamber has a diameter larger than those of said first and second limiting passages and communicates with said main liquid chamber via a third limiting passage for absorbing high-frequency vibrations, and wherein said negative-pressure means sets said third air chamber under negative pressure.

2. A vibration isolator according to claim 1, wherein a surface of said second air chamber facing said second diaphragm is formed in a concave shape.

3. A vibration isolator according to claim 1, wherein said second diaphragm in a free state has a cross-sectionally convex shape projecting toward said second auxiliary liquid chamber, and said inner wall surface of said second air chamber facing said second diaphragm is substantially symmetrical with a configuration of said second diaphragm with a plane between said second auxiliary liquid chamber and said second air chamber serving as a plane of symmetry.

4. A vibration isolator according to claim 1, wherein an opening communicating with said negative-pressure means is formed in said second air chamber, and a soft material is fixed to a peripheral edge of said opening of said second air chamber for abutment against said second diaphragm.

5. A vibration isolator according to claim 1, further comprising:

control means for controlling said negative-pressure means, wherein said control means causes said negative-pressure means to be actuated in correspondence with at least one of a speed of a vehicle and an engine speed of a vehicle.

6. A vibration isolator according to claim 1, wherein said negative-pressure means causes at least one of intake negative pressure of an engine and the atmospheric air to be applied to said second air chamber.

7. A vibration isolator according to claim 1, wherein said second auxiliary liquid chamber is disposed in the same direction as a radial direction of said hollow cylindrical member.

8. A vibration isolator according to claim 1, wherein said second auxiliary liquid chamber is formed in a member secured to an outer side of and disposed within said hollow cylindrical member.

9. A vibration isolater for absorbing vibrations of different frequencies from a vibration-generating source, comprising:

a hollow cylindrical member having therein a main liquid chamber to which the vibrations are transmitted;

first-limiting passage constituting means for constituting a first limiting passage having one end communicating with said main liquid chamber;

first-auxiliary-liquid-chamber constituting means for constituting a first auxiliary liquid chamber communicating with another end of said first limiting passage and capable of undergoing expansion and shrinkage;

second-limiting-passage constituting means for constituting a second limiting passage having one end communicating with said main liquid chamber;

second-auxiliary-wall constituting means disposed in said hollow cylindrical member and provided with an air chamber in an expandable and shrinkable second auxiliary liquid chamber which is formed within a side wall thereof communicating with another end of said second limiting passage via a diaphragm;

negative-pressure means communicating with said air chamber for fixing said diaphragm so as to prevent the expansion and shrinkage of said second auxiliary liquid chamber; and a third auxiliary liquid chamber communicating with said main liquid chamber and located adjacent a third air chamber, wherein said third auxiliary liquid chamber has a diameter larger than those of said first and second limiting passages and communicates with said main liquid chamber via a third limiting passage for absorbing high-frequency vibrations, and wherein said negative-pressure means sets said third air chamber under negative pressure.

10. A vibration isolator according to claim 9, wherein a surface of said air chamber facing said diaphragm is formed in a concave shape.

11. A vibration isolator according to claim 9, wherein said air chamber is connected to said negative-pressure means.

12. A vibration isolator for absorbing and attenuating vibrations from a vibration-generating portion, comprising:

a mounting member connected to one of said vibration-generating portion and a vibrating-receiving portion;

a hollow cylindrical member connected to the other one of said vibration-generating portion and said vibrating-receiving portion;

a resilient member connected to said mounting member, said resilient member being disposed to close one opening of said hollow cylindrical member and being adapted to be deformed during the occurrence of the vibrations;

a first diaphragm for closing another opening of said hollow cylindrical member;

a partition member disposed at an inner side of said hollow cylindrical member, said partition member partitioning an inner space of said hollow cylindrical member;

an expandable and shrinkable main liquid chamber disposed within said hollow cylindrical member between said resilient member and said partition member;

a first auxiliary liquid chamber disposed within said hollow cylindrical member between said first diaphragm and said partition member;

a first limiting passage connecting said main liquid chamber and said first auxiliary liquid chamber thereby allowing communication with each other;

a first air chamber disposed facing a side of said first diaphragm opposite to a side thereof where said first auxiliary liquid chamber is disposed;

a second auxiliary liquid chamber formed within a side wall of said hollow cylindrical member;

a second diaphragm constituting a part of a partition wall of said second auxiliary liquid chamber;

a second air chamber disposed on a side of said second diaphragm opposite to a side thereof where said second auxiliary liquid chamber is disposed, said second air chamber being arranged such that when an interior thereof is set under negative pressure, said second air chamber causes said second diaphragm to be brought into close contact with an inner wall surface thereof causing said second air chamber to virtually disappear and preventing the movement of said second diaphragm;

a second limiting passage connecting said main liquid chamber and said second auxiliary liquid chamber thereby allowing communication with each other;

negative-pressure means for setting the interior of said second air chamber under negative pressure;

control means for controlling said negative-pressure means by causing said negative-pressure means to be actuated in correspondence with at least one of a vehicle speed and an engine speed of a vehicle; and a third auxiliary liquid chamber communicating with said main liquid chamber and located adjacent a third air chamber, wherein said third auxiliary liquid chamber has a diameter larger than those of said first and second limiting passages and communicates with said main liquid chamber via a third limiting passage for absorbing high-frequency vibrations, and wherein said negative-pressure means sets said third air chamber under negative pressure.

* * * * *